(12) United States Patent
Yamada

(10) Patent No.: US 10,435,331 B2
(45) Date of Patent: Oct. 8, 2019

(54) HONEYCOMB STRUCTURE

(71) Applicant: NGK INSULATORS, LTD., Nagoya (JP)

(72) Inventor: Toshio Yamada, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 80 days.

(21) Appl. No.: 15/706,839

(22) Filed: Sep. 18, 2017

(65) Prior Publication Data

US 2018/0093929 A1    Apr. 5, 2018

(30) Foreign Application Priority Data

Sep. 30, 2016 (JP) ................................. 2016-194052

(51) Int. Cl.
| | |
|---|---|
| *B01D 46/24* | (2006.01) |
| *C04B 38/00* | (2006.01) |
| *B01D 53/94* | (2006.01) |
| *B01J 23/10* | (2006.01) |
| *B01J 23/46* | (2006.01) |
| *B01J 23/745* | (2006.01) |
| *B01J 23/63* | (2006.01) |
| *B01J 35/04* | (2006.01) |

(52) U.S. Cl.
CPC ...... *C04B 38/0012* (2013.01); *B01D 46/2455* (2013.01); *B01D 46/2462* (2013.01); *B01D 46/2474* (2013.01); *B01D 53/94* (2013.01); *B01D 53/945* (2013.01); *B01J 23/10* (2013.01); *B01J 23/464* (2013.01); *B01J 23/63* (2013.01); *B01J 23/745* (2013.01); *B01D 2046/2481* (2013.01); *B01D 2255/1021* (2013.01); *B01D 2255/1023* (2013.01); *B01D 2255/1025* (2013.01); *B01D 2255/2065* (2013.01); *B01D 2255/2092* (2013.01); *B01D 2279/30* (2013.01); *B01J 35/04* (2013.01); *Y02T 10/22* (2013.01)

(58) Field of Classification Search
CPC ............. B01D 46/247; B01D 46/2455; B01D 46/2462; B01D 46/2474; B01D 53/94; B01D 53/945; B01J 23/10; B01J 23/464; B01J 23/63; B01J 23/745; C04B 38/0012
USPC ................................... 428/116, 118
See application file for complete search history.

(56) References Cited

U.S. PATENT DOCUMENTS 4,988,483 A * 1/1991 Usui .................. B01J 35/04 422/180
5,073,432 A * 12/1991 Horikawa ............... B01J 35/04 428/116

(Continued)

FOREIGN PATENT DOCUMENTS

JP     2010-184218 A1    8/2010

*Primary Examiner* — Tri V Nguyen
(74) *Attorney, Agent, or Firm* — Burr & Brown, PLLC

(57) ABSTRACT

A honeycomb structure includes a honeycomb substrate including latticed partition walls which define a plurality of cells extending from one end face to the other end face and forming through channels for fluid and a honeycomb outer wall, and a flange portion attached to a part of the honeycomb outer wall of the honeycomb substrate, and including latticed flange partition walls which define a plurality of flange cells extending from one flange end face to the other flange end face and a flange outer wall, and in the honeycomb substrate, a ratio of a non-outer wall region in which the honeycomb outer wall is not disposed is in a range of 10 to 90% to a total area of a substrate circumferential surface.

6 Claims, 8 Drawing Sheets

(56) References Cited

U.S. PATENT DOCUMENTS

2004/0266619 A1* 12/2004 Bernas ................ B29C 47/0028
428/116
2014/0123612 A1* 5/2014 Yamada ............. B01D 46/2459
55/523

* cited by examiner

HONEYCOMB STRUCTURE

The present application is an application based on JP-2016-194052 filed on Sep. 30, 2016 with Japan Patent Office, the entire contents of which are incorporated herein by reference.

BACKGROUND OF THE INVENTION

Field of the Invention

The present invention relates to a honeycomb structure, and more particularly, it relates to a honeycomb structure including a flange portion at a circumference of a honeycomb substrate.

Description of the Related Art

Heretofore, honeycomb structures made of ceramics have been used in various use applications such as a car exhaust gas purifying catalyst carrier, a particulate removing filter for exhaust gas purification, and a heat reservoir for a burning device. Such a ceramic honeycomb structure is manufactured by adjusting viscosity of a forming material (a kneaded material), extruding the material in the form of a desirable honeycomb by use of an extruder, rawly cutting, drying and finishing a honeycomb formed body, and then firing the honeycomb formed body at a high temperature. Here, the honeycomb structure has latticed partition walls which define a plurality of cells forming through channels for fluid and extending from one end face to the other end face.

The ceramic honeycomb structures are manufactured in various shapes in accordance with the use applications, trapping performances and the like, and in general, the ceramic honeycomb structure possessing a round pillar shape or a prismatic columnar shape is often employed. Furthermore, as parts of the ceramic honeycomb structures, there are manufactured honeycomb structures each including a honeycomb substrate positioned on a honeycomb inner side, and a flange portion positioned on a honeycomb outer side and disposed in a part of a honeycomb outer wall formed at a circumference of the honeycomb substrate. As the honeycomb structure having such a structure, for example, there is disclosed a honeycomb structure including a flange portion having at least one tapered end face (e.g., see Patent Document 1).

The honeycomb structure including this flange portion (hereinafter referred to simply as "the honeycomb structure") is stored in a can member made of a metal, and through this canning, the honeycomb structure is used as, for example, an exhaust gas purifying catalyst carrier, a particulate trapping filter or the like. At this time, the honeycomb structure has a state where the flange portion is mainly in contact with the can member via a holding material and a portion (the honeycomb substrate) other than the flange portion is not in contact with the can member or the holding material. Consequently, an area of the honeycomb structure which comes in contact with the holding material or the metal can member having high thermal conductivity is minimized, whereby, for example, the honeycomb structure does not generate unnecessary heat loss and advantageously indicates such suitable thermal characteristics. Furthermore, it is possible to hold the flange portion with a robot arm or the like during conveyance of the honeycomb structure in a manufacturing process thereof or during canning of the honeycomb structure in the can member, and it is possible to prevent unnecessary load from being applied to the honeycomb substrate. As a result, the honeycomb structure has characteristics to prevent damages on the honeycomb structure and to facilitate a conveying operation or the like.

The honeycomb structure including the above-mentioned flange portion is formed by previously preparing the honeycomb structure including the flange portion and having a large honeycomb diameter and cutting a circumferential surface to obtain the honeycomb substrate having a desirable honeycomb diameter, while leaving the flange portion. Afterward, the cut substrate circumferential surface in which cells or partition walls are exposed is coated with a well-known circumference coating material, followed by drying, to form a honeycomb outer wall. Thus, the honeycomb outer wall is formed, whereby it is possible to increase strength of the honeycomb structure itself and it is also possible to inhibit generation of defects such as lack of cells due to impact applied onto the honeycomb structure during the conveyance or the canning.

[Patent Document 1] JP-A-2010-184218

SUMMARY OF THE INVENTION

However, the above-mentioned honeycomb structure occasionally causes problems mentioned below. Specifically, the honeycomb structure for use in an exhaust gas purifying catalyst carrier, a particulate trapping filter or the like is used in a stored state in a can member, and hence a honeycomb outer wall formed on a substrate circumferential surface of a honeycomb substrate is not especially practically required after the honeycomb structure is stored in the can member. Furthermore, due to the presence of the honeycomb outer wall, a heat capacity of the honeycomb structure itself increases, and thermal characteristics might be influenced. Due to these factors, a temperature rise rate or a burning efficiency of trapped particulates might deteriorate, when the honeycomb structure is used as the exhaust gas purifying catalyst carrier, the particulate trapping filter or the like.

Therefore, to perform an operation of forming the honeycomb outer wall which is hardly required after the honeycomb structure is stored in the can member becomes a factor to deteriorate a manufacturing efficiency of the honeycomb structure, and the honeycomb structure might excessively involve raw material cost of a circumference coating material or the like to form the honeycomb outer wall. In particular, during the canning of the honeycomb structure in the can member, or the like, a flange portion is held with a robot arm or the like, and hence any force is not directly applied to the honeycomb substrate. Consequently, the honeycomb substrate may only have a necessary minimum strength, and the can member has a function of protecting the honeycomb structure from external impact after the honeycomb structure is stored in the can member.

Consequently, in view of the above situations, an object of the present invention is to provide a honeycomb structure in which a part of a honeycomb outer wall is omitted, so that a heat capacity is decreased to achieve improvement of thermal properties and so that a manufacturing process of the honeycomb structure is simplified to increase a manufacturing efficiency and to enable decrease of manufacturing cost.

According to the present invention, there is provided a honeycomb structure which achieves the above object.

According to a first aspect of the present invention, a honeycomb structure is provided including a honeycomb substrate including latticed partition walls which define a plurality of cells extending from one end face to the other end face and forming through channels for fluid and a honeycomb outer wall, and a flange portion attached to a part of the honeycomb outer wall of the honeycomb substrate, and including latticed flange partition walls which define a plurality of flange cells extending from one flange end face to the other flange end face and a flange outer wall, wherein in the honeycomb substrate, a ratio of a non-outer wall region in which the honeycomb outer wall is not disposed is in a range of 10 to 90% to a total area of a substrate circumferential surface.

According to a second aspect of the present invention, the honeycomb structure according to the above first aspect is provided, wherein the ratio of the non-outer wall region to the total area of the substrate circumferential surface is in a range of 40 to 80%.

According to a third aspect of the present invention, the honeycomb structure according to the above first or second aspects is provided, wherein the honeycomb substrate has plugging portions arranged in the cells in accordance with a predetermined arrangement standard.

According to a fourth aspect of the present invention, the honeycomb structure according to any one of the above first to third aspects is provided, wherein a honeycomb diameter of the honeycomb substrate in the non-outer wall region is smaller than a honeycomb diameter thereof in an outer wall region having the honeycomb outer wall.

According to a fifth aspect of the present invention, the honeycomb structure according to any one of the above first to fourth aspects is provided, wherein the flange portion has tapered portions tilted to the flange outer wall.

According to a sixth aspect of the present invention, the honeycomb structure according to any one of the above first to fifth aspects is provided, wherein the flange portion has a flange central axis at a position eccentric to a central axis of the honeycomb substrate.

According to the present invention, a honeycomb structure has a non-outer wall region in which a honeycomb outer wall is not disposed on a substrate circumferential surface of a honeycomb substrate of the honeycomb structure, and hence it is possible to achieve decrease of a heat capacity. Furthermore, an operation accompanying formation of the honeycomb outer wall is simplified, and hence it is possible to improve a manufacturing efficiency and it is also possible to minimize manufacturing cost.

DESCRIPTION OF THE PREFERRED EMBODIMENTS

Hereinafter, embodiments of a honeycomb structure of the present invention will be described in detail with reference to the drawings. It is to be noted that the honeycomb structure of the present invention is not especially limited to the following embodiments, and various design changes, modifications, improvements and the like are addable without departing from the gist of the present invention.

Figure 1:
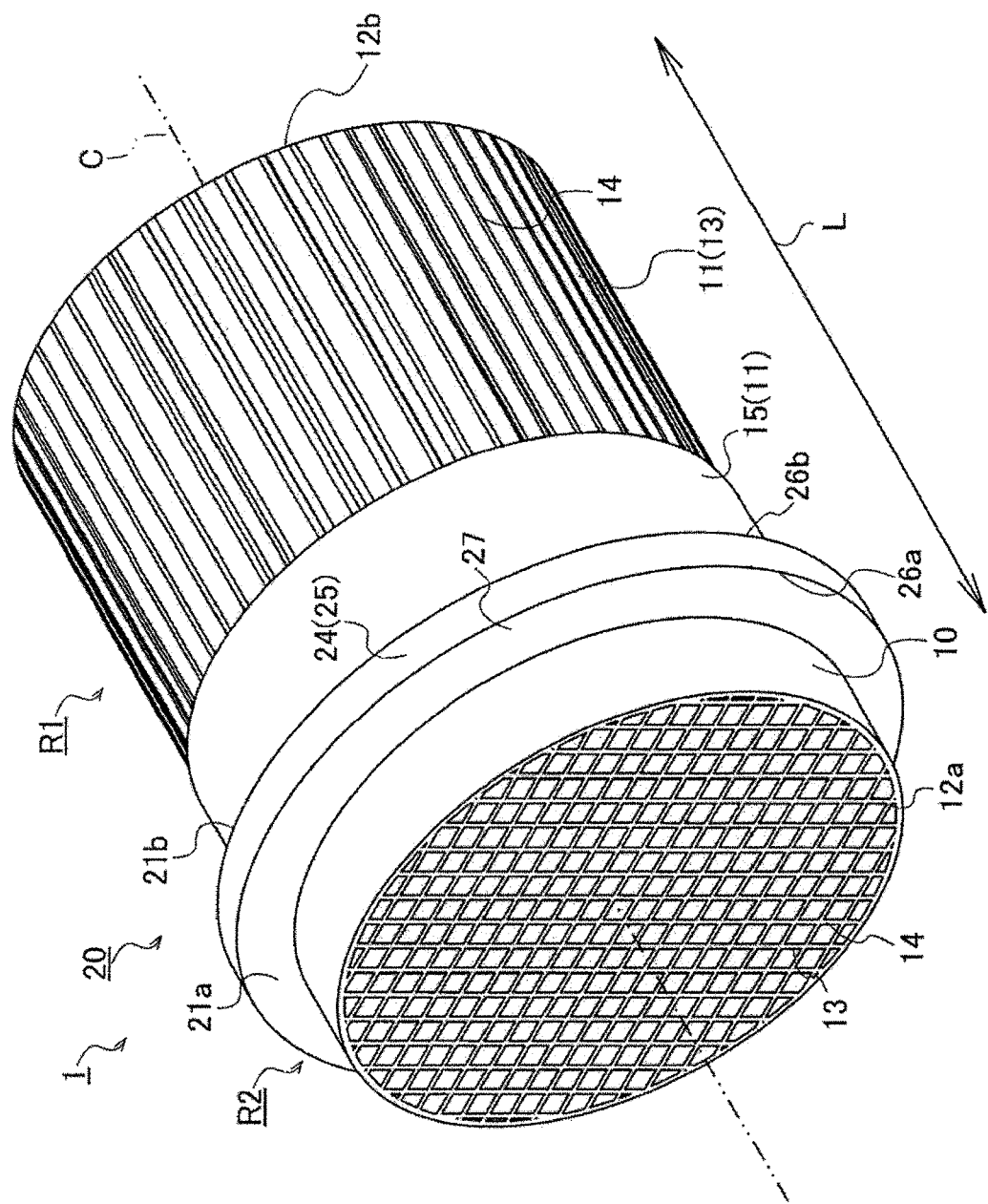
FIG. 1 is a perspective view schematically showing a schematic constitution of a honeycomb structure of one embodiment of the present invention.
Figure 2:
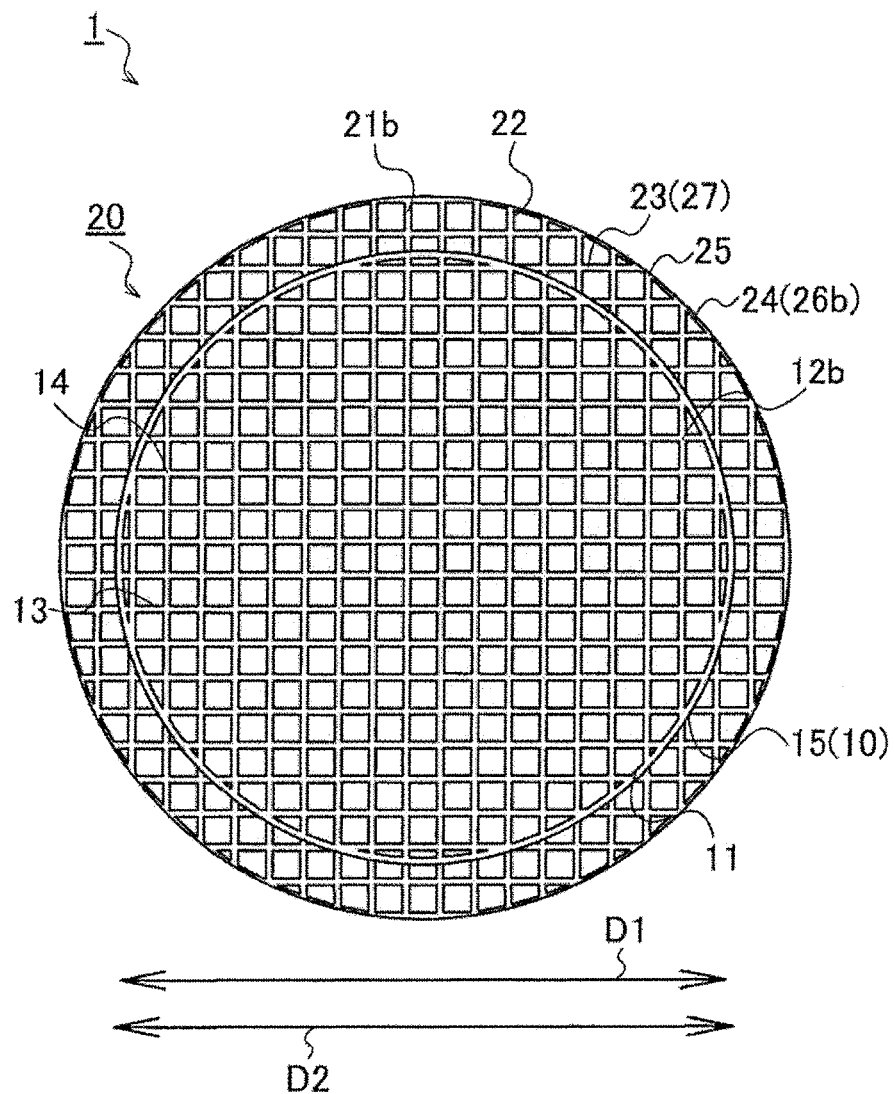
FIG. 2 is a front view showing the schematic constitution of the honeycomb structure and seen from the side of the other end face.
Figure 3:
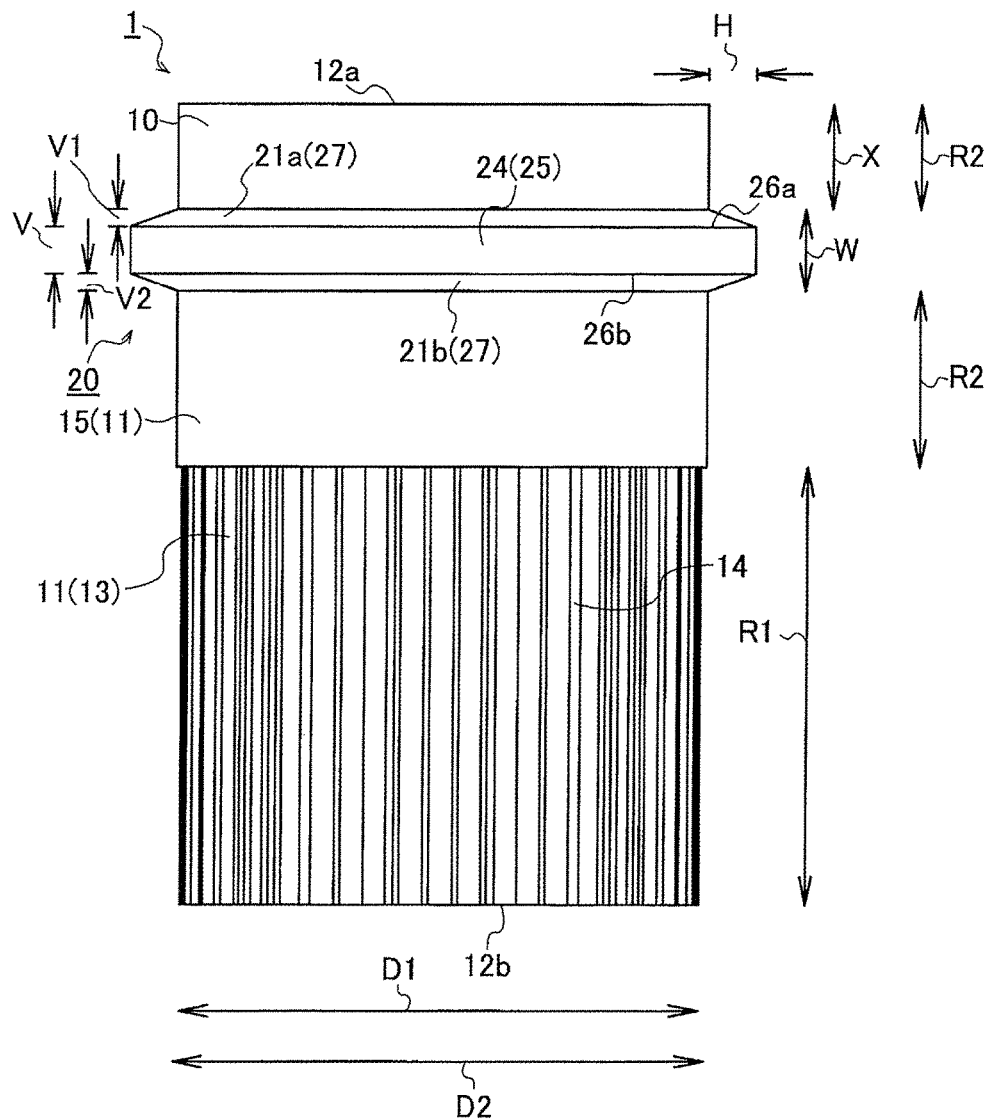
FIG. 3 is a plan view showing the schematic constitution of the honeycomb structure.

As shown in FIG. 1 to FIG. 3, a honeycomb structure 1 of the present embodiment mainly includes a honeycomb substrate 10 formed by using a ceramic material such as cordierite, and a flange portion 20 formed by using the ceramic material similarly to the honeycomb substrate 10 and formed in a part of a substrate circumferential surface 11 of the honeycomb substrate 10.

The honeycomb substrate 10 entirely possesses a round pillar shape and includes latticed partition walls 14 which define a plurality of cells 13 extending from one end face 12a to the other end face 12b and forming through channels for fluid, and a honeycomb outer wall 15 disposed to cover at least a part of the substrate circumferential surface 11.

On the other hand, the flange portion 20 is constituted of a substantially round ring-shaped member having a central axis matching a central axis C (see FIG. 1) of the honeycomb substrate 10, attached to a part of the honeycomb outer wall 15 and projecting concentrically from the honeycomb outer wall 15 along a circumferential direction. Similarly to the honeycomb substrate 10, the flange portion 20 has latticed flange partition walls 23 which define a plurality of flange cells 22 extending from one flange end face 21a to the other flange end face 21b and forming the through channels for fluid, and a flange outer wall 25 which entirely covers a flange circumferential surface 24.

Furthermore, the flange portion 20 includes a pair of tapered portions 27 connected at predetermined tilt angles to the honeycomb outer wall 15 formed on the substrate circumferential surface 11 of the honeycomb substrate 10 and both end portions 26a and 26b of the flange outer wall 25 disposed in parallel with the honeycomb outer wall 15, and a flange main body having a length corresponding to a flange outer wall length V (see FIG. 3) of the flange outer wall 25 between the tapered portions 27. It is to be noted that in FIG. 1 and FIG. 3, constitutions of the flange cells 22 and the flange partition walls 23 which appear in tilt surfaces (corresponding to the flange end faces 21a and 21b) of the pair of tapered portions 27, respectively, are omitted to simplify the drawing. Here, a total of the flange outer wall length V of the flange outer wall 25 and each of flange end face lengths V1 and V2 of the pair of flange end faces 21a and 21b between which the flange outer wall 25 is sandwiched is a flange portion length W (see FIG. 3). Furthermore, a dimension from the substrate circumferential surface 11 of the honeycomb substrate 10 to the flange outer wall 25 of the flange portion 20 is defined as a flange portion thickness H.

In the honeycomb structure 1 of the present embodiment, the flange portion 20 having the tapered portions 27 is present at a position of about ⅕, from the side of the one end face 12a, of a length L (a honeycomb length) from the one end face 12a to the other end face 12b of the honeycomb substrate 10 in an axial direction. In other words, the flange portion 20 is disposed at a position away as much as a distance X (see FIG. 3) from an inlet side end face (corresponding to the one end face 12a). Furthermore, the honeycomb structure has "a non-outer wall region R1" in which the honeycomb outer wall 15 is not disposed on the substrate circumferential surface 11 of the honeycomb substrate 10, in a range of ½ or more of the length L from the other end face 12b of the honeycomb substrate 10 in the axial direction.

On the other hand, the honeycomb structure has "an outer wall region R2" in which the honeycomb outer wall 15 is disposed, in the substrate circumferential surface 11 of the honeycomb substrate 10 excluding the non-outer wall region R1. Here, a honeycomb diameter D2 of the honeycomb substrate 10 in the outer wall region R2 in which the honeycomb outer wall 15 is disposed is larger than a honeycomb diameter D1 of the honeycomb substrate 10 in the non-outer wall region R1 as much as a dimension corresponding to a honeycomb outer wall thickness (see FIG. 2 and FIG. 3).

As described above, the honeycomb outer wall 15 of the honeycomb substrate 10 is formed by cutting the honeycomb substrate to obtain a desirable honeycomb diameter (corresponding to the honeycomb diameter D1), and coating the substrate circumferential surface 11 exposed to the outside with a circumference coating material (not shown), followed by drying.

Further specifically, in the honeycomb structure 1 of the present embodiment, a ratio of the non-outer wall region R1 of the honeycomb substrate 10 in which the honeycomb outer wall 15 is not disposed is in a range of 10 to 90% to a total area of the substrate circumferential surface 11. Further preferably, the ratio of the non-outer wall region R1 to the total area is in a range of 40 to 80%. Here, as shown in FIG. 3, the total area of the substrate circumferential surface 11 is a total of respective region areas of the non-outer wall region R1 and two outer wall regions R2 between which the flange portion 20 is sandwiched and in which the honeycomb outer wall 15 is disposed.

It has been described that in the honeycomb structure 1 of the present embodiment, the position of the flange portion 20 is the position of about ⅕ from the one end face 12a side of the honeycomb substrate 10, but the present invention is not limited to this embodiment, and the position can be set to an optional position along the length L of the honeycomb substrate 10 in the axial direction. In other words, the flange portion may be disposed at any position as long as the ratio of the non-outer wall region R1 to the total area is in the above numeric range.

As already described, the flange portion 20 in the honeycomb structure 1 has a function of a portion to be held in the honeycomb structure to be held with a robot arm or the like in a process of manufacturing the honeycomb structure 1 or a canning process of storing, in a can member, the honeycomb structure for use as a particulate trapping filter or the like. Furthermore, in case of using the honeycomb structure as an exhaust gas purifying catalyst carrier, a particulate trapping filter or the like, the flange portion of the honeycomb structure stored in the can member comes in contact with the can member directly or via a holding material.

Therefore, the honeycomb substrate is stored in a non-contact state with the can member, and after the storing (canning), the honeycomb outer wall 15 of the honeycomb substrate 10 is hardly practically required. In other words, certain or more strength of the honeycomb structure 1 may only be guaranteed before storing the honeycomb structure in the can member, and damages on the partition walls and others due to impact applied during the canning, conveyance or the like can only be prevented.

Thus, the honeycomb structure 1 of the present invention purposely has the non-outer wall region R1 in which the honeycomb outer wall 15 is not disposed in a part of the substrate circumferential surface 11 of the honeycomb substrate 10, and the strength of the honeycomb structure 1 is adjusted into a necessary minimum state. Therefore, a ratio of the region to the total area of the substrate circumferential surface 11 is specified in the above range.

Here, when the ratio of the non-outer wall region R1 to the total area is smaller than 10%, the honeycomb outer wall 15 is present mostly in the substrate circumferential surface 11 of the honeycomb substrate 10, and it is hardly possible to obtain an effect due to the presence of the non-outer wall region R1, especially an effect which contributes to weight saving of the honeycomb structure 1. An effect of decreasing a heat capacity also deteriorates.

On the other hand, when the ratio of the non-outer wall region R1 to the total area of the substrate circumferential surface 11 is larger than 90%, the substrate circumferential surface 11 hardly includes the honeycomb outer wall 15, and there is the fear that the strength of the honeycomb structure 1 remarkably deteriorates. Consequently, the risk of damaging the honeycomb structure 1 by the impact during canning, conveyance or the like increases. Therefore, the ratio of the non-outer wall region R1 to the total area is adjusted in a range of 10% to 90%. Furthermore, when the ratio is adjusted in a range of 40% to 80%, conditions can be optimized to acquire the effect of the presence of the non-outer wall region R1 and the sufficient practical strength of the honeycomb structure 1.

Furthermore, the honeycomb structure has the non-outer wall region R1 in the substrate circumferential surface 11, and hence it is possible to simplify and save an operation of laboriously constructing the honeycomb outer wall 15, and it is possible to achieve shortening of operation time, or the like. In addition, it is possible to noticeably decrease an amount of a circumference coating material for use to coat the substrate circumferential surface 11, and hence it is possible to suppress manufacturing cost. Furthermore, time of a step of drying the circumference coating material and another step for the formation of the honeycomb outer wall can shorten.

Furthermore, when the honeycomb structure does not have the honeycomb outer wall 15, it is also possible to perform a purifying treatment of an exhaust gas or the like by use of a portion of the non-outer wall region R1. In other words, as compared with a conventional honeycomb structure, it is possible to increase a contact area of the cells 13 with the exhaust gas or the like, and a purifying efficiency of the exhaust gas or the like can improve. In addition, the cells 13 of the non-outer wall region R1 of the honeycomb structure 1 may have plugging portions (not shown) in accordance with a predetermined arrangement standard. Consequently, further improvement of a purification performance can be expected.

Here, there is not any special restriction on a manufacturing method of the honeycomb structure to constitute the honeycomb structure 1 of the present embodiment. In other words, a heretofore well known technique to manufacture the honeycomb structure including the flange portion is usable. For example, through steps of extruding, drying and firing a honeycomb formed body including the flange portion 20 and having a large honeycomb diameter, a basic honeycomb structure (not shown) for the honeycomb structure 1 of the present embodiment is manufactured in advance.

Afterward, a structure circumferential surface of the honeycomb structure is cut, while leaving a portion corresponding to the flange portion 20, and the honeycomb structure is thus processed to obtain the honeycomb diameter D1 of the round pillar-shaped honeycomb substrate 10. Consequently, there is formable the honeycomb structure 1 having the round pillar-shaped honeycomb substrate 10, and the flange portion 20 projecting from a part of the substrate circumferential surface 11 and formed monolithically with the honeycomb substrate 10.

At this time, on the substrate circumferential surface 11 of the honeycomb substrate 10, parts of the cells 13 and parts of the partition walls 14 are exposed to the outside by the cutting. Therefore, the outer wall region R2 having the honeycomb outer wall 15 is coated with the circumference coating material. At this time, a masking treatment is performed on a portion (the non-outer wall region R1) which is not coated with the circumference coating material, and a countermeasure is taken so that the circumference coating material does not adhere to the substrate circumferential surface 11. Consequently, there is formed the honeycomb structure 1 including, in the substrate circumferential surface 11 of the honeycomb substrate 10, two regions, i.e., the non-outer wall region R1 in which the honeycomb outer wall 15 is not disposed and the outer wall region R2 in which the honeycomb outer wall 15 is disposed, and the flange portion 20. Furthermore, in the one flange end face 21a and the other flange end face 21b or the tapered portions 27 in the flange portion 20, end portions of the flange partition walls 23 may be coated with the circumference coating material to increase strength of the flange partition walls 23 and to prevent damages on the flange partition walls 23. Furthermore, a circumference of the flange portion 20 is cut by the cutting, and the circumference may then be coated with the circumference coating material. Consequently, the flange portion 20 can more precisely be prepared to adjust its diameter.

The honeycomb structure 1 of the present invention is not especially limited to the honeycomb structure having the honeycomb substrate 10 and the flange portion 20 as shown in FIG. 1 to FIG. 3, and arrangements, shapes and the like of the non-outer wall region R1 and the outer wall region R2 are optionally settable.

Figure 4A:
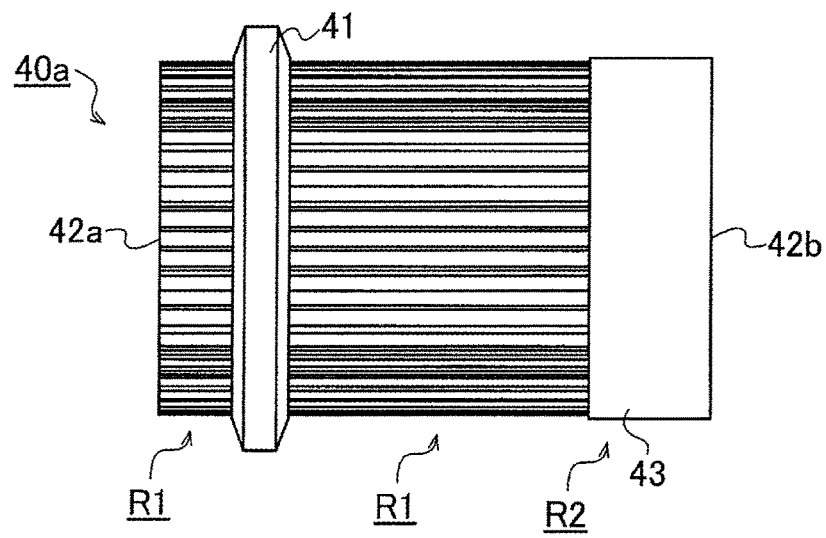
FIG. 4A is a plan view showing one example of a honeycomb structure of another constitution of the present invention.

For example, the honeycomb structure may be a honeycomb structure 40a (see FIG. 4A) in which non-outer wall regions are disposed on both sides of a flange portion 41, i.e., one end face 42a side and the other end face 42b side, respectively, or may be a honeycomb structure 40b (see FIG. 4B) having a non-outer wall region R1 in a central portion of a length L of a honeycomb substrate 43 in an axial direction.

On the other hand, there has been illustrated the honeycomb structure 1 of the present embodiment in which the flange portion 20 includes the pair of tapered portions 27, but the present invention is not limited to this embodiment. For example, the honeycomb structure may be a honeycomb structure 50a (see FIG. 5A) including a flange portion 54 having flange end faces 51a and 51b each of which is disposed perpendicularly to a substrate circumferential surface 53 of a honeycomb substrate 52 and having a flange portion length W and a flange portion thickness H, including a non-outer wall region R1 on the side of the other end face 55b of the honeycomb substrate 52, and including an outer wall region R2 having a distance X from an inlet end face which corresponds to a distance from the side of one end face 55a, or the honeycomb structure may be a honeycomb structure 50b (see FIG. 5B) including a flange portion 54 mentioned above and including a non-outer wall region R1 in a central portion of a honeycomb substrate 52 along a length L in an axial direction.

Furthermore, the honeycomb structure may be a honeycomb structure 60a (see FIG. 6A) including a flange portion 63 having flange end faces 62a and 62b which are perpendicular to a substrate circumferential surface 61, a pair of non-outer wall regions R1 disposed on both sides of the flange portion 63 to sandwich the flange portion therebetween, and an outer wall region R2 in the vicinity of the other end face 65b side of a honeycomb substrate 64, or the honeycomb structure may be a honeycomb structure 60b (see FIG. 6B) including a flange portion 63 mentioned above, and non-outer wall regions R1 which are disposed on one end face 65a side of a honeycomb substrate 64 and in a part of the other end face 65b side thereof, respectively.

Figure 7A:
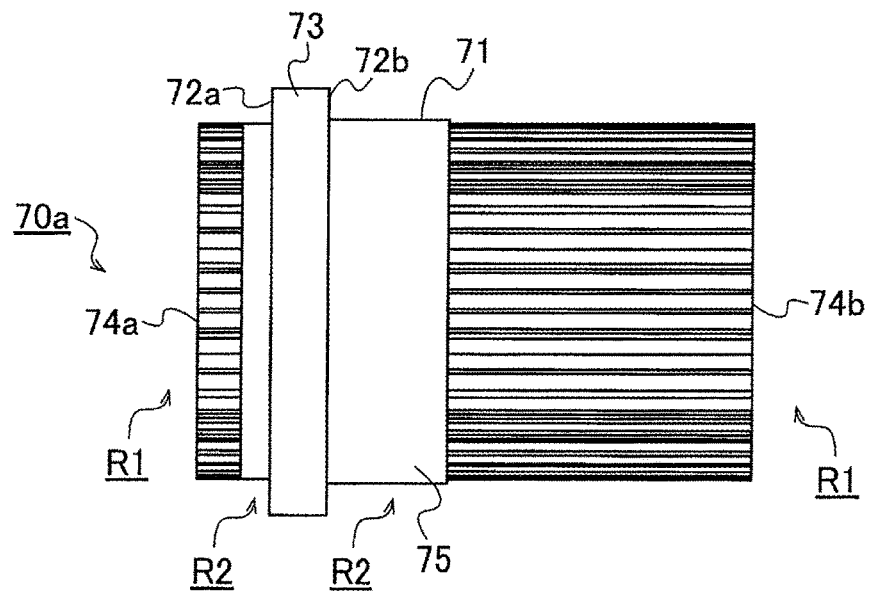
FIG. 7A is a plan view showing one example of a honeycomb structure of a further constitution of the present invention.
Figure 7B:
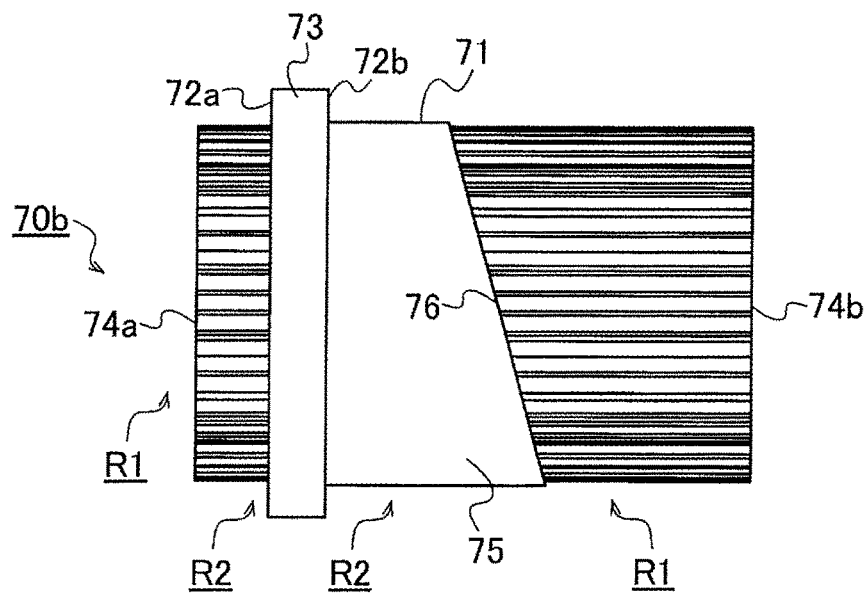
FIG. 7B is a plan view showing another example of the honeycomb structure of the constitution of the present invention.
Figure 8:
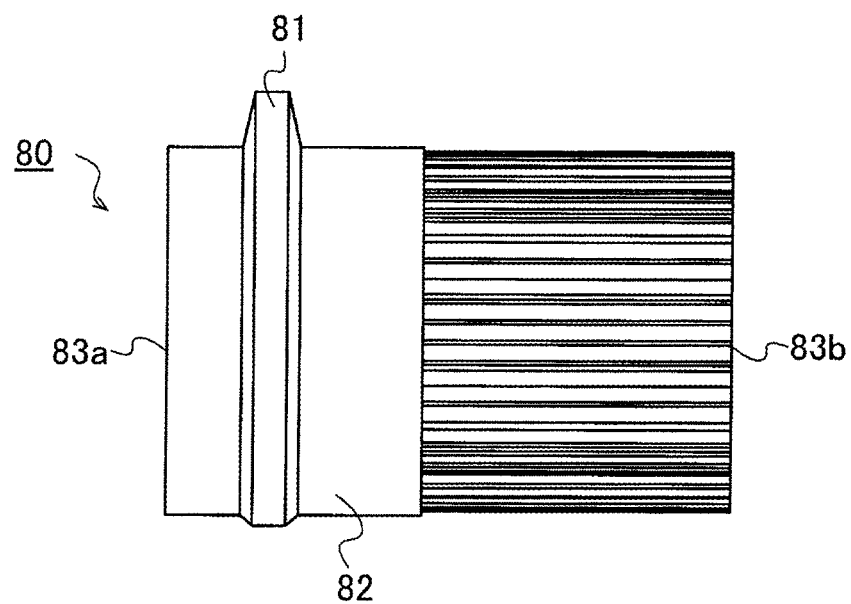
FIG. 8 is a plan view showing one example of a honeycomb structure of a still further constitution of the present invention.

Furthermore, the honeycomb structure may be a honeycomb structure 70a (see FIG. 7A) including a flange portion 73 having flange end faces 72a and 72b which are perpendicular to a substrate circumferential surface 71, including a pair of non-outer wall regions R1 in the vicinities of one end face 74a and the other end face 74b which are disposed away from the flange portion 73, respectively, and including outer wall regions R2 in the vicinities of both sides of the flange portion 73, or the honeycomb structure may be a honeycomb structure 70b (see FIG. 7B) including a tilted boundary portion 76 tilted to an axial direction of a honeycomb substrate 75 in a boundary between a non-outer wall region R1 and an outer wall region R2 in the honeycomb substrate 75. Alternatively, the honeycomb structure may be a honeycomb structure 80 (see FIG. 8) including a flange portion 81 having a flange central axis at a position eccentric to a central axis of a honeycomb substrate 82, including a non-outer wall region R1 on the side of the other end face 83b, and including an outer wall region R2 on the side of one end face 83a.

In each of the honeycomb structures 40a, 40b, 50a, 50b, 60a, 60b, 70a, 70b and 80 shown in FIG. 4A to FIG. 8 and mentioned above, a ratio of the non-outer wall region R1 to a total area of the substrate circumferential surface 53 or the like is limited to the above range, the honeycomb structures may variously be selected in accordance with use applications and performances to exert, and the optional honeycomb structure 40a or the like is employable.

In addition, on the basis of the honeycomb structure 1 or the like in which the cells 13 are exposed to the outside as in the present embodiment, a honeycomb structure may be constituted as required to dispose plugging portions (not shown) every shifting position of the cells 13 alternately in the one end face 12a and the other end face 12b in the honeycomb structure 1.

Hereinafter, examples of the honeycomb structure of the present invention will be described, but the honeycomb structure of the present invention is not limited to these examples.

EXAMPLES

Example 1

A pore former, an organic binder and water were added to a cordierite forming raw material to obtain a forming raw material. The forming raw material was mixed and kneaded to prepare a round pillar-shaped kneaded material. As the organic binder, methylcellulose was used, and 5 parts by mass of methylcellulose was added to 100 parts by mass of the cordierite forming raw material. The water was added as a dispersing medium and a ratio of the water to be added to the whole forming raw material was adjusted into 10 mass %. The cordierite forming raw material becomes cordierite when fired. Specifically, the cordierite forming raw material is a ceramic raw material prepared by mixing "predetermined raw materials" to obtain a chemical composition so that a content ratio of silica ($SiO_2$) is in a range of 42 to 56 mass %, a content ratio of alumina ($Al_2O_3$) is in a range of 30 to 45 mass %, and a content ratio of magnesia (MgO) is in a range of 12 to 16 mass %. Here, "the predetermined raw materials" are raw materials selected from the group consisting of talc, kaolin, calcined kaolin, alumina, aluminum hydroxide, and silica.

Next, the kneaded material was extruded by using a predetermined die, to obtain a honeycomb formed body including partition walls defining a plurality of cells, and a circumferential wall extruded simultaneously and monolithically with the partition walls. In the honeycomb formed body, a cell shape (a shape of each cell in a cross section perpendicular to a cell extending direction) was square, and the honeycomb formed body entirely had a round pillar shape.

Next, the obtained honeycomb formed body was dried by induction heating and hot air drying, and then fired at the highest temperature of 1420° C. for 100 hours to prepare a honeycomb fired body.

The obtained honeycomb fired body had a partition wall thickness of 100 μm and a cell density of 95 cells/cm². Furthermore, porosity of the partition walls of the honeycomb fired body was 55%. Furthermore, an average pore diameter of the honeycomb fired body was 15 μm. The honeycomb fired body had a round pillar shape in which a diameter was 225 mm and a length in the cell extending direction was 260 mm, and an outer wall thickness was 0.6 mm. It is to be noted that the porosity and the average pore diameter are values measured with a mercury porosimeter.

Next, a circumferential portion of the obtained honeycomb fired body was ground to form a honeycomb substrate and a flange portion. At this time, a circumference of a portion which became the flange portion was not ground. Consequently, the honeycomb substrate and the flange portion were formed. As a method of grinding the circumferential portion of the honeycomb fired body, there was performed a method of pressing "a grinding wheel sprinkled with diamond" onto the circumferential portion of the honeycomb fired body, while rotating the honeycomb fired body and also rotating the grinding wheel. A tilt angle was not made in each end face of the flange portion. In other words, both the end faces of the flange portion were not tapered.

Figure 5A:
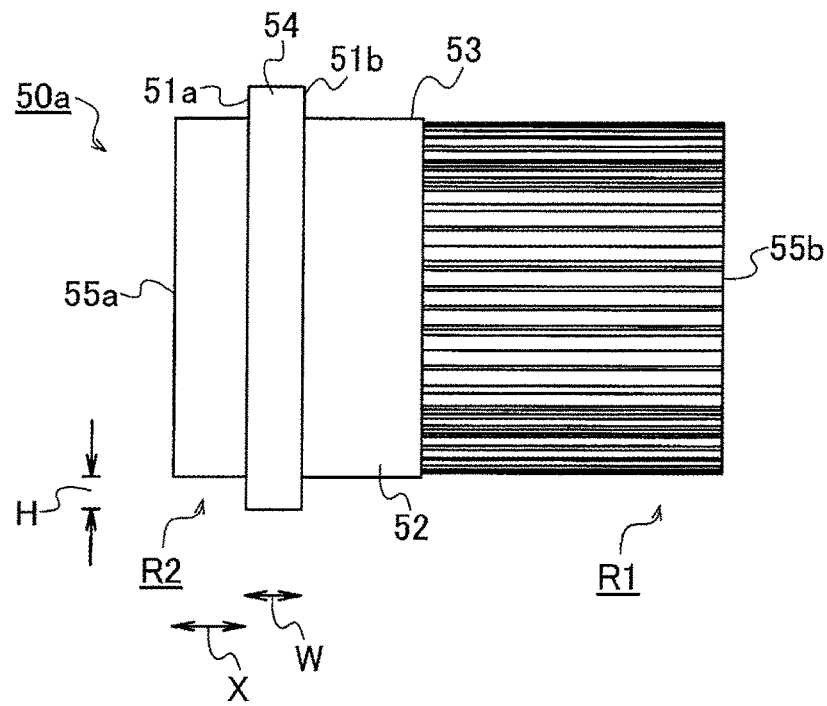
FIG. 5A is a plan view showing one example of a honeycomb structure of still another constitution of the present invention.

A part of a circumference of the ground honeycomb substrate was coated with a circumference coating material in such a pattern as shown in FIG. 5A and so that a ratio of a non-outer wall region was 10%.

Furthermore, during the coating with the circumference coating material, end portions of flange partition walls were also coated with the circumference coating material by use of a spatula in both the end faces of the flange portion, followed by drying, to coat the flange portion end faces with the circumference coating material.

A thickness of the circumference coating material on both the end faces of the flange portion and the honeycomb substrate was 1 mm. Consequently, a diameter (a honeycomb diameter D2) of an outer wall forming portion of the honeycomb substrate was 210 mm. At this time, a diameter (a honeycomb diameter D1) of a non-outer wall region was 208 mm. It is to be noted that, needless to say, the outer wall forming portion may previously be ground as much as a small diameter corresponding to the thickness of the circumference coating material so that the diameter of the outer wall forming portion becomes equal to the diameter of the non-outer wall region.

Examples 2 to 15 and Comparative Examples 1 to 6

The procedure of Example 1 was repeated except that a cell density, a wall thickness and a ratio of a non-outer wall region were changed to obtain structures described in Table 1 mentioned below, to prepare honeycomb structures. Each of the honeycomb structures of Examples 4 and 5 and Comparative Example 1 was prepared so that a flange outer wall length V was 10 mm and each of flange end face lengths V1 and V2 was 5 mm. Furthermore, in each of Examples 8 and 9, a honeycomb fired body having a diameter of 230 mm was ground to form a honeycomb substrate and a flange portion. A circumference of the ground honeycomb substrate was coated with a circumference coating material to obtain a pattern and the ratio of the non-outer wall region shown in Table 1.

Furthermore, each of the honeycomb structures of Examples 12 to 15 and Comparative Examples 5 and 6 was prepared so that a flange central axis was eccentric as much as 0.2 mm to a central axis of the honeycomb substrate. The eccentricity is preferable in that the honeycomb structure is hard to rotate even when vibration or the like is generated after the honeycomb structure is stored in a can member. It is preferable that the eccentricity is in a range of about 0.1 mm to 5 mm.

As to the obtained honeycomb structures, "a purification performance test" and "appearance check" were carried out by methods mentioned below. Table 1 mentioned below shows the results.

First, a catalyst was loaded onto partition walls of the obtained structure. There was used the catalyst containing platinum (Pt), rhodium (Rh) and palladium (Pd) at a mass ratio of 1:0.5:4 (Pt:Rh:Pd) and containing alumina and ceria as main components. An amount of the catalyst to be loaded was 150 g/L. The amount (g/L) of the catalyst to be loaded is an amount (g) of the catalyst to be loaded per unit volume (1 L) of the honeycomb structure.

A non-thermally expandable ceramic mat was wound around the honeycomb structure onto which the catalyst was loaded. This ceramic mat was wound around the flange portion. Then, the honeycomb structure around which the ceramic mat was wound was stored in a can member which was made of stainless steel (SUS430) and divided into two pieces, followed by welding, to assemble the can member for the test in which the honeycomb structure was stored.

Thus, the prepared can member (the can member for the test), in which the honeycomb structure was stored, was used as an exhaust gas purifying device in the test.

(Purification Performance Test)

There was run, on a chassis dynamometer, a car in which a direct injection type gasoline engine having a displacement of 2.0 L was mounted and to which the exhaust gas purifying device using each of the honeycomb structures of Examples 1 to 15 and Comparative Examples 1 to 6 was attached, to carry out evaluation of a purification performance of the device. Specifically, the 2.0 L gasoline engine car was run in New European Driving Cycle (NEDC) mode, and emission (unit: g/km) of hydrocarbons (HC), carbon monoxide (CO) and nitrogen oxides ($NO_x$) in an exhaust gas were measured during the running in the NEDC mode. Each of the exhaust gas purifying devices of Examples 1 to 15 and Comparative Examples 1 to 3 was evaluated in accordance with the following evaluation criteria A to D on the basis of the device having the same cell density and wall thickness. In other words, for Examples 1 to 11 and Comparative Examples 1 to 3, Comparative Example 4 was defined as a reference, for Examples 12 and 13, Comparative Example 5 was defined as a reference, and for Examples 14 and 15, Comparative Example 6 was defined as a reference, to carry out the evaluation.

The evaluation was carried out in accordance with ratios (percentages) of the HC emission, CO emission and $NO_x$ emission of the exhaust gas purifying device of an evaluation target to the HC emission, CO emission and $NO_x$ emission of the exhaust gas purifying device of Comparative Example 4, 5 or 6 of the reference. Hereinafter, the above ratio (percentage) of the HC emission, CO emission and $NO_x$ emission of the exhaust gas purifying device of the evaluation target will generically be referred to as "the emission ratios" sometimes.

(Evaluation Criteria of Purification Performance)

A: In the emission ratios of the HC emission, CO emission and $NO_x$ emission of the exhaust gas purifying device of the evaluation target, the emission ratio having the largest value was 93% or less.

B: In the emission ratios of the HC emission, CO emission and $NO_x$ emission of the exhaust gas purifying device of the evaluation target, the emission ratio having the largest value was in excess of 93% and 96% or less.

C: In the emission ratios of the HC emission, CO emission and $NO_x$ emission of the exhaust gas purifying device of the evaluation target, the emission ratio having the largest value was in excess of 96% and 99% or less.

D: In the emission ratios of the HC emission, CO emission and $NO_x$ emission of the exhaust gas purifying device of the evaluation target, the emission ratio having the largest value was in excess of 99%.

It is to be noted that when the evaluation of the purification performance is "A", it can be considered that the purification performance is especially suitable. When the evaluation is "B", it can be considered that the purification performance is more suitable. When the evaluation is "C", it can be considered that the purification performance is suitable. When the evaluation is "D", it can be considered that the purification performance substantially does not generally change or deteriorates.

(Appearance Check of Honeycomb Structure after Purification Performance Test)

Appearance of the honeycomb structure subjected to the above purification performance test was visually checked, and damage situations during the catalyst loading, storage in the can member, assembling and purification performance test were observed and evaluated in accordance with the following evaluation criteria.

(Evaluation Criteria of Appearance Check)

A: Any abnormalities such as damages were not seen at all.

B: The damages were present, but a maximum dimension of a damaged portion was smaller than 1 mm, and the number of damaged portions was 2 or less.

C: The damages were present, but the maximum dimension of the damaged portion was smaller than 2 mm, and the number of the damaged portions was 3 or less.

D: The damages were present and the maximum dimension of the damaged portion was 2 mm or more.

It is to be noted that in the appearance check of the honeycomb structure subjected to the purification performance test, when the evaluation is "A", it can be considered that the honeycomb structure does not have any problems and is especially suitable, and when the evaluation is "B", it can be considered that the damages are limited and the honeycomb structure does not have any practical problems and is more suitable. When the evaluation is "C", it can be considered that the honeycomb structure does not have any practical problems and is suitable. When the evaluation is "D", there is the possibility that the honeycomb structure causes the practical problem. All the damaged portions were present in the non-outer wall region in which the honeycomb outer wall was not disposed.

General evaluation was carried out from the purification performance test and the appearance check after the purification performance test. Table 1 mentioned below shows a summary of a constitution, a flange portion shape, a ratio of the non-outer wall region and the results of the respective performance evaluations in the honeycomb structures of Examples 1 to 15 and Comparative Examples 1 to 6.

TABLE 1

Figure 6A:
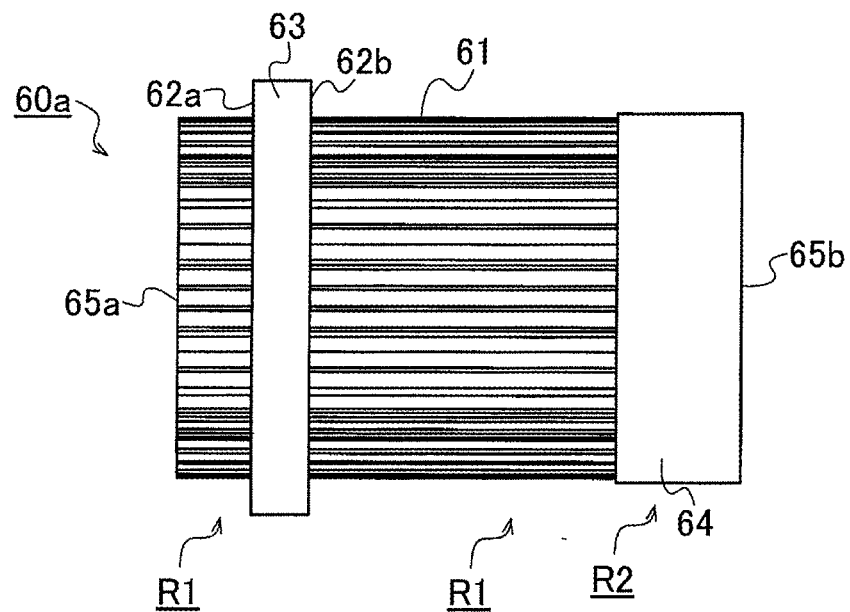
FIG. 6A is a plan view showing one example of a honeycomb structure of a further constitution of the present invention.
Figure 6B:
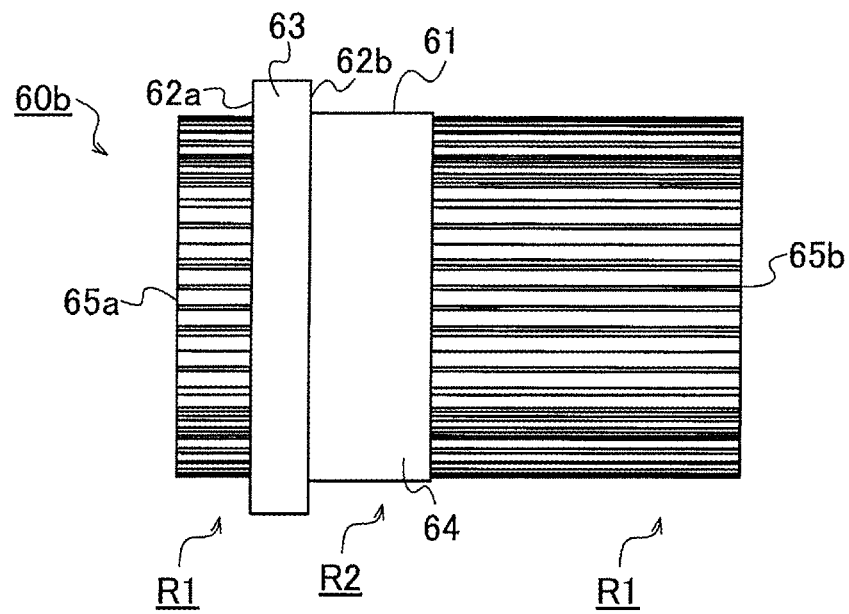
FIG. 6B is a plan view showing another example of the honeycomb structure of the constitution of the present invention.

| | Cell density (cells/cm$^2$) | Wall thickness (μm) | Distance (X) of flange portion from inlet side end face (mm) | Flange portion length (W) (mm) | Flange portion thickness (H) (mm) | Flange portion shape | Outer wall forming portion shape | Ratio of non-outer wall region (%) | Evaluation of purification performance | Appearance check evaluation after purification performance test | General evaluation |
|---|---|---|---|---|---|---|---|---|---|---|---|
| Example 1 | 95 | 100 | 10 | 20 | 7.5 | Non-tapered | FIG. 5A | 10 | C | A | C |
| Example 2 | 95 | 100 | 10 | 20 | 7.5 | Non-tapered | FIG. 5A | 30 | B | A | B |
| Example 3 | 95 | 100 | 10 | 20 | 7.5 | Non-tapered | FIG. 5A | 40 | A | A | A |
| Example 4 | 95 | 100 | 10 | 20 | 7.5 | Tapered | FIG. 3 | 50 | A | A | A |
| Example 5 | 95 | 100 | 10 | 20 | 7.5 | Tapered | FIG. 3 | 70 | A | A | A |
| Example 6 | 95 | 100 | 10 | 20 | 7.5 | Non-tapered | FIG. 6B | 80 | A | A | A |
| Example 7 | 95 | 100 | 10 | 20 | 7.5 | Non-tapered | FIG. 6B | 90 | A | C | C |
| Example 8 | 95 | 100 | 40 | 30 | 10 | Non-tapered | FIG. 5A | 40 | A | A | A |

TABLE 1-continued

Figure 4B:
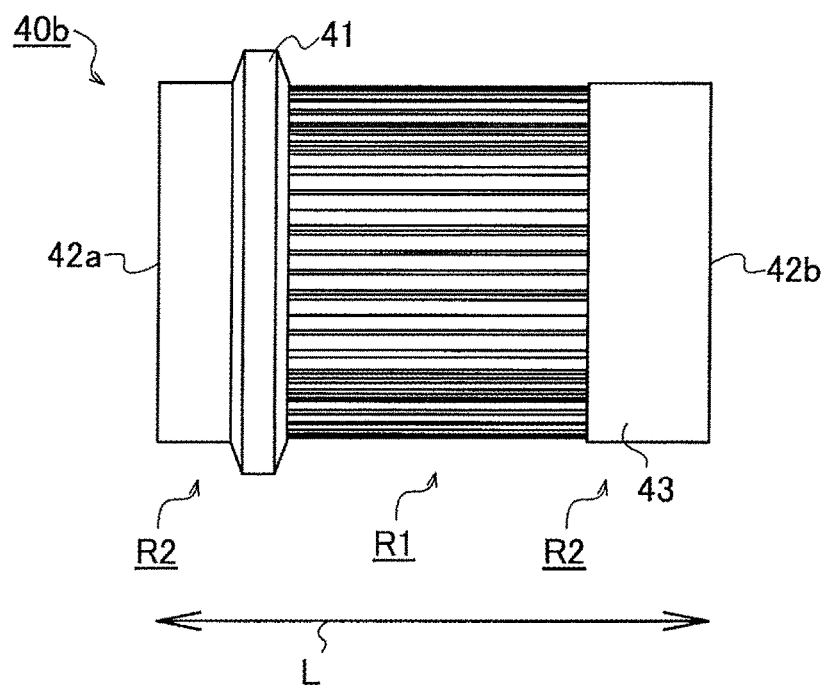
FIG. 4B is a plan view showing another example of the honeycomb structure of the constitution of the present invention.
Figure 5B:
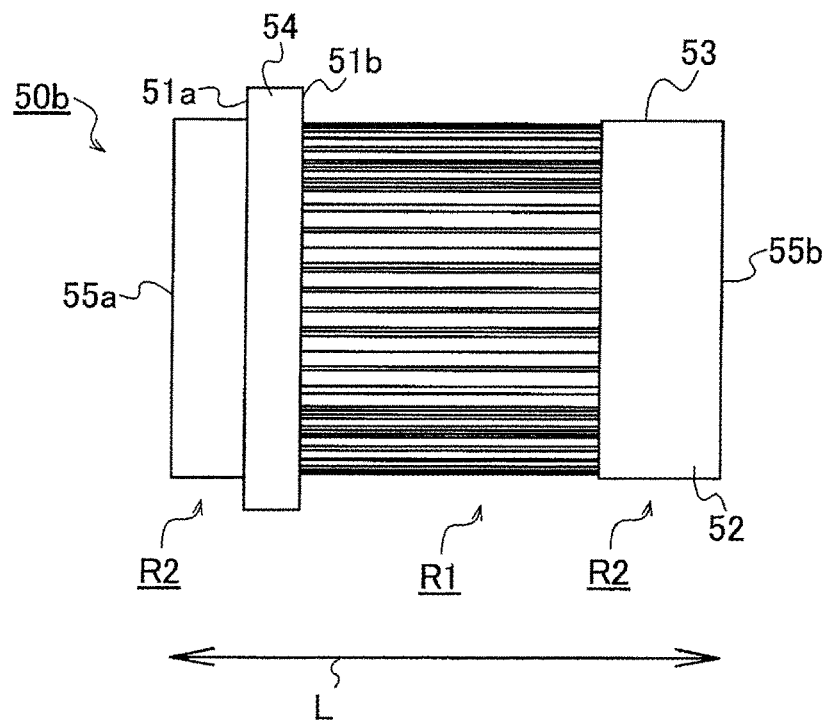
FIG. 5B is a plan view showing another example of the honeycomb structure of the constitution of the present invention.

| | Cell density (cells/cm²) | Wall thickness (μm) | Distance (X) of flange portion from inlet side end face (mm) | Flange portion length (W) (mm) | Flange portion thickness (H) (mm) | Flange portion shape | Outer wall forming portion shape | Ratio of non-outer wall region (%) | Evaluation of purification performance | Appearance check evaluation after purification performance test | General evaluation |
|---|---|---|---|---|---|---|---|---|---|---|---|
| Example 9 | 95 | 100 | 40 | 30 | 10 | Non-tapered | FIG. 6B | 80 | A | A | A |
| Example 10 | 95 | 100 | 120 | 20 | 7.5 | Non-tapered | FIG. 5A | 10 | C | A | C |
| Example 11 | 95 | 100 | 120 | 20 | 7.5 | Non-tapered | FIG. 6B | 90 | A | C | C |
| Example 12 | 50 | 50 | 50 | 20 | 7.5 | Non-tapered | FIG. 5A | 10 | C | A | C |
| Example 13 | 50 | 50 | 50 | 20 | 7.5 | Non-tapered | FIG. 6A | 90 | A | C | C |
| Example 14 | 60 | 150 | 50 | 20 | 7.5 | Non-tapered | FIG. 5B | 10 | C | A | C |
| Example 15 | 60 | 150 | 50 | 20 | 7.5 | Non-tapered | FIG. 6B | 90 | A | C | C |
| Comparative Example 1 | 95 | 100 | 50 | 20 | 7.5 | Tapered | FIG. 4B | 5 | D | A | D |
| Comparative Example 2 | 95 | 100 | 50 | 20 | 7.5 | Non-tapered | FIG. 5A | 7 | D | A | D |
| Comparative Example 3 | 95 | 100 | 50 | 20 | 7.5 | Non-tapered | FIG. 6B | 95 | A | D | D |
| Comparative Example 4 | 95 | 100 | 50 | 20 | 7.5 | Non-tapered | — | 0 | — | — | — |
| Comparative Example 5 | 50 | 50 | 50 | 20 | 7.5 | Non-tapered | — | 0 | — | — | — |
| Comparative Example 6 | 60 | 150 | 50 | 20 | 7.5 | Non-tapered | — | 0 | — | — | — |

Such results shown in Table 1 were obtained. The honeycomb structures of Examples 1 to 15 obtained more satisfactory results than the honeycomb structures of Comparative Examples 1 to 6. It is to be noted that the honeycomb structure is usable as, for example, an exhaust gas purifying filter having plugging portions alternately in one end face and the other end face to form alternate patterns in the end faces. Furthermore, the honeycomb structure does not have to be monolithically formed, but the honeycomb structure may be obtained by combining segments each having a polygonal shape such as a quadrangular shape by use of a bonding layer or the like, or may be obtained by using another ceramic material such as silicon carbide.

A honeycomb structure of the present invention is suitably usable as a car exhaust gas purifying catalyst carrier, a particulate removing filter for exhaust gas purification, a heat reservoir for a burning device, or the like.

DESCRIPTION OF REFERENCE NUMERALS 1, 40a, 40b, 50a, 50b, 60a, 60b, 70a, 70b and 80: honeycomb structure, 10, 43, 52, 64, 75 and 82: honeycomb substrate, 11, 53, 61 and 71: substrate circumferential surface, 12a, 42a, 55a, 65a, 74a and 83a: one end face, 12b, 42b, 55b, 65b, 74b and 83b: the other end face, 13: cell, 14: partition wall, 15: honeycomb outer wall, 20, 41, 54, 63, 73 and 81: flange portion, 21a, 51a, 62a and 72a: one flange end face, 21b, 51b, 62b and 72b: the other flange end face, 22: flange cell, 23: flange partition wall, 24: flange circumferential surface, 25: flange outer wall, 26a and 26b: both end portions, 27: tapered portion, 76: tilted boundary portion, C: central axis, D1 and D2: honeycomb diameter, H: flange portion thickness, L: length in an axial direction, R1: non-outer wall region, R2: outer wall region, V: flange outer wall length, V1 and V2: flange end face length, X: distance from an inlet side end face, and W: flange portion length.

What is claimed is:

1. A honeycomb structure comprising:
    a honeycomb substrate including latticed through channel partition walls extending along a longitudinal direction from one end face to the other end face and forming a plurality of through channel cells for a fluid and a honeycomb outer wall; and
    a flange portion attached to a part of the honeycomb outer wall of the honeycomb substrate, and including latticed flange partition walls which define a plurality of flange cells extending from one flange end face to the other flange end face and a flange outer wall,
    wherein in the honeycomb substrate, a ratio of an area of a non-outer wall region in which the honeycomb outer wall is not disposed is in a range of 10 to 90% to a total area of a substrate circumferential surface, and
    wherein the non-outer wall region includes exposed latticed through channel partition walls along the longitudinal direction.

2. The honeycomb structure according to claim 1, wherein the ratio of the non-outer wall region to the total area of the substrate circumferential surface is in a range of 40 to 80%.

3. The honeycomb structure according to claim 1, wherein the honeycomb substrate has plugging portions arranged in the plurality of through channel cells in accordance with a predetermined arrangement standard.

4. The honeycomb structure according to claim 1, wherein a honeycomb diameter of the honeycomb substrate in the non-outer wall region is smaller than a honeycomb diameter thereof in an outer wall region having the honeycomb outer wall.

5. The honeycomb structure according to claim 1, wherein the flange portion has tapered portions tilted to the flange outer wall.

6. The honeycomb structure according to claim 1, wherein the flange portion has a flange central axis at a position eccentric to a central axis of the honeycomb substrate.

* * * * *